Sept. 2, 1941.  H. NERWIN  2,254,537
PHOTOGRAPHIC OBJECTIVE
Filed June 24, 1939
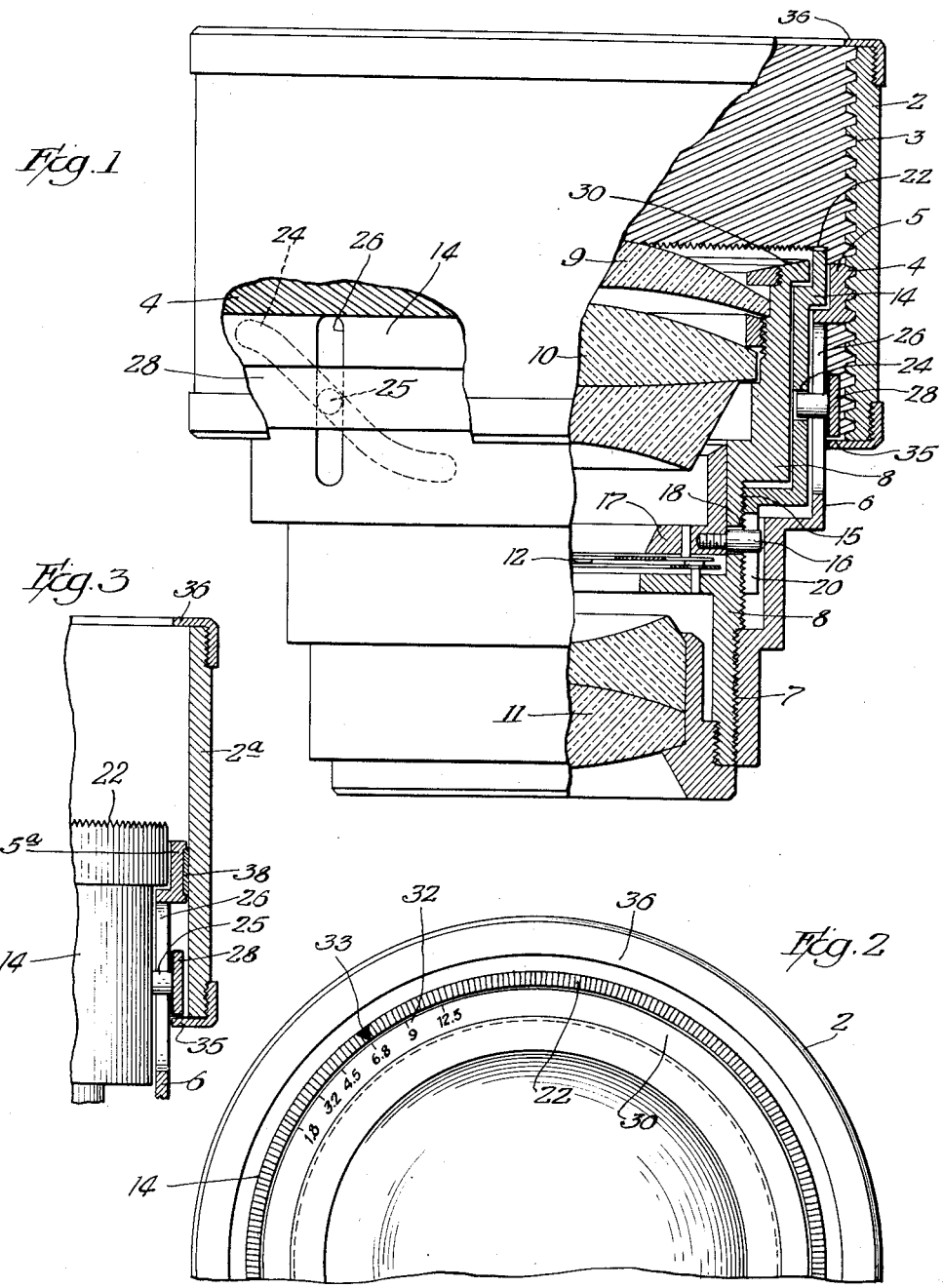
Inventor.
Hubert Nerwin
by B. Singer & F. Stern
his Attys.

Patented Sept. 2, 1941

2,254,537

UNITED STATES PATENT OFFICE 2,254,537

PHOTOGRAPHIC OBJECTIVE

Hubert Nerwin, Dresden, Germany, assignor to Zeiss Ikon Aktiengesellschaft, Dresden, Germany Application June 24, 1939, Serial No. 280,899 In Germany October 10, 1938

8 Claims. (Cl. 95—64)

The invention relates to improvements in photographic objectives provided with a sunshade and particularly is directed to a novel mounting and adjustment of the sunshade on the mount of the objective.

The present invention is an improvement over my copending patent application Serial No. 260,738 filed March 9, 1939.

It is an object of the invention to provide a photographic objective with an adjustable sunshade which is axially movably attached to the mount of the objective and whose movement into its extended operative position is limited in accordance with the selected aperture of the objective.

Another object of the invention is to provide the photographic objective with an adjustable diaphragm and make the movement of the sunshade into its extended operative position dependent upon the aperture to which said diaphragm has been adjusted, but nevertheless permitting a complete or partial withdrawal of the sunshade from its extended operative position without changing the adjustment of the aperture of the diaphragm.

It is also an object of the invention to provide the mount of the objective with an axially adjustable control ring which is operatively coupled with a manually operable diaphragm adjusting ring and forms a stop for the sunshade when the latter is moved from its retracted inoperative position outwardly to an extended operative position.

Other objects of the invention will become apparent from the following description with reference to the accompanying drawing which illustrates by way of example one embodiment of the invention:

In the drawing:

Fig. 1 is an elevation view, partly in section and with parts broken away, of a photographic objective provided with a sunshade, the latter being shown in an operative extended position.

Fig. 2 is a front view of the photographic objective with the sunshade thereon, and Fig. 3 illustrates a modification.

In the embodiment of the invention illustrated in Fig. 1 the sunshade consists of a tubular member 2 provided on its inner wall with a thread 3 engaging a corresponding exterior thread 4 on the outer circumference of an annular collar 5 integrally formed with a stationary sleeve member 6. Preferably a multiplex thread 3 having a high pitch is employed so that the tubular member 2 can be moved by a relatively short rotative movement from its fully extended operative position to its fully retracted inoperative position and vice versa. The lower end of the sleeve member 6 is fixedly secured by an interior thread 7 or the like to an inner tubular member 8, the latter supports not only the axially spaced lens units 9, 10 and 11 respectively, but also the adjustable diaphragm 12 which is mounted between the lens units. The tubular member 6 forms a carrier for the sunshade 2, but also may be considered as a part of the objective mount, because it completely surrounds the length supporting part 8 of the same and is firmly attached thereto at 7. A diaphragm adjusting ring 14 is mounted rotatably in an annular space formed between the upper or outer ends of the sleeve members 6 and 8. The diaphragm adjusting ring 14 is supported by the inner sleeve member 8 by means of a fine thread 15. A radial pin 16 secured to the rotatably adjustable member 17 of the diaphragm 12 projects through a circumferential slot 18 in the stationary inner sleeve member 8 and into an axial slot 20 of the diagram adjusting ring 14 so as to be circumferentially adjusted whenever the ring 14 is rotated. The upper end of the ring 14 projects slightly from the upper ends of the sleeve members 6 and 8 and its edge is knurled or otherwise roughened at 22 so as to be easily accessible and rotatable by the fingers of the user of the camera to which the objective is attached.

The diaphragm adjusting ring 14 is provided between its ends with a number of circumferentially spaced cam slots 24, preferably three in number. A pin 25 projects into each of these cam slots 24 and also through guide slots 26 in the stationary outer sleeve member 6. The pins 25 are fixedly secured to a control ring 28 which is slidably mounted on the outer circumference of the outer sleeve member 6 and is surrounded by the tubular sunshade 2. In the illustrated embodiment the cam slots 24 extend spirally around the axis of the objective, while the guide slots 26 extend parallel to the axis of the objective, but obviously the slots 24 and 26 may be arranged differently as long as they perform their desired function, which is to permit a proper adjustment of the sunshade 2 corresponding to the employed aperture of the diaphragm 12.

It will be apparent that each rotative adjustment of the diaphragm adjusting ring 14 is accompanied by an axial displacement of the control ring 28 on the circumference of the stationary sleeve member 6. The upper end face 30 of the inner sleeve member 8 is provided with a scale 32 (Fig. 2) indicating f-stops to which the objective may be adjusted by bringing an index 33 on the edge of the diaphragm adjusting ring 14 into registration with the desired scale division.

The tubular sunshade 2 is independently movable with respect to the objective mount and the diaphragm adjusting ring, except that it cannot be moved into a position in which it would restrict the light coming from the scene to be photographed beyond the limit of the selected diaphragm aperture. When the sunshade 2 is moved outwardly into an extended position it finally will be stopped by the lower edge of the control ring 28 which will come into engagement with an inwardly extending flange 35 on the lower end of the tubular sunshade 2. The drawing illustrates that the diaphragm 12 has been adjusted to stop 6.3 (Fig. 2) and that the sunshade 2 has been moved outwardly against the control ring 28, thus adjusting the sunshade automatically to a position in which the objective is shaded to its highest permissible degree with respect to the selected aperture f:6.3. It is, however, possible, to withdraw the sunshade to a less extended position or to withdraw the sunshade completely into its inoperative position, without changing the adjustment of the diaphragm, when this should be desired for any reason whatsoever. In the inoperative position of the sunshade 2 the upper inwardly extended flange 36 engages the upper face of the collar 5, so that a disengagement of the sunshade 2 from the lens mount is prevented.

Fig. 3 illustrates a somewhat different manner of how the tubular sunshade may be mounted on the outer sleeve member 6. Instead of a threaded connection a simple slidable connection is employed. The inner wall of the tubular member is made smooth and engages slidable the smooth outer circumference of the collar 5ᵃ on the sleeve 6. Preferably, the collar 5ᵃ is provided with an annular groove for receiving an annular spring ring 38 which yieldingly engages the inner wall of the tubular member 2ᵃ.

What I claim is:

1. In combination with a photographic objective provided with a lens mount, an adjustable diaphragm, a rotatable diaphragm adjusting ring, a tubular member forming a sunshade attached axially adjustable to the outside of said lens mount, an inwardly extending annular shoulder at the rear end of said tubular member, and a member slidably supported on the circumference of said mount and operatively connected with said diaphragm adjusting ring by a pin and slot connection so as to be moved in axial direction of the objective when the diaphragm adjusting ring is rotated, said member being adapted to be engaged by the inwardly extending shoulder of said tubular member for limiting the movement of the latter from its retracted inoperative position to its operative position in which it projects beyond the front end of said objective mount.

2. In combination with a photographic objective provided with a lens mount, an adjustable diaphragm, a rotatable diaphragm adjusting ring, a tubular member forming a sunshade attached axially adjustable on the outside of a portion of the lens mount having a larger diameter than the remaining portion of the mount, a ring slidably mounted on the outside of the portion of the lens mount having the smaller diameter, and means operatively connecting said ring with said diaphragm adjusting ring for moving said ring in axial direction of said objective when said diaphragm adjusting ring is rotated, said ring being adapted to be engaged by said tubular member for limiting the movement of the latter from its retracted inoperative position to its operative position in which it projects beyond the front end of said objective mount.

3. In combination with a photographic objective provided with a lens mount, an adjustable diaphragm, a rotatable diaphragm adjusting ring, a tubular member forming a sunshade attached axially adjustable on the outside of a portion of the lens mount having a larger diameter than the remaining portion of the mount, a ring loosely surrounded by said tubular member and slidably mounted on the outside of the portion of the lens mount having the smaller diameter, and means operatively connecting said ring with said diaphragm adjusting ring for moving said ring in axial direction of said objective when said diaphragm adjusting ring is rotated, said ring being adapted to be engaged by a flange extending inwardly from the inner circumference of said tubular member for limiting the movement of the latter from its retracted inoperative position to its operative position in which it projects beyond the front end of said objective mount.

4. In combination with a photographic objective provided with a lens mount comprising two concentrically arranged sleeve members connected at one end with each other and forming an annular space between each other at the other end, an adjustable diaphragm, a rotatable diaphragm adjusting ring mounted within the annular space between said sleeve members and projecting therefrom, a tubular member forming a sunshade attached axially adjustable on the outer circumference of the outer sleeve member, a ring mounted for axial movement on said outer sleeve member, and means operatively connecting said diaphragm adjusting ring with said ring for adjusting the latter when said diaphragm adjusting ring is rotated, said ring being adapted to be engaged by said tubular member for limiting the movement of the latter from its retracted inoperative position to its operative position in which it projects beyond the front end of the lens mount.

5. In combination with a photographic objective provided with a lens mount comprising two concentrically arranged sleeve members connected at one end with each other and forming an annular space between each other at the other end, an adjustable diaphragm, a rotatable diaphragm adjusting ring mounted within the annular space between said sleeve members and projecting therefrom, a tubular member forming a sunshade attached axially adjustable on the outer circumference of the outer sleeve member, a ring mounted for axial movement on said outer sleeve member, and means operatively connecting said diaphragm adjusting ring with said ring for adjusting the latter when said diaphragm adjusting ring is rotated, said means comprising a pin on said ring extending through a guide slot in said outer sleeve member and into a cam slot arranged in said diaphragm adjusting ring, said ring being adapted to be engaged by said tubular member for limiting the movement of the latter from its retracted inoperative position to its operative position in which it projects beyond the front end of the lens mount.

6. In combination with a photographic objective provided with a lens mount comprising two concentrically arranged sleeve members connected at one end with each other and forming an annular space between each other at the other end, an adjustable diaphragm, a rotatable diaphragm adjusting ring mounted within the annular space between said sleeve members and projecting therefrom, a tubular member forming a sunshade attached axially adjustable on the outer circumference of an annular projection on the outer sleeve member, a ring mounted for axial movement on said outer sleeve member, and means operatively connecting said diaphragm adjusting ring with said ring for adjusting the latter when said diaphragm adjusting ring is rotated, said ring being loosely surrounded by said tubular member adapted to be engaged by an inwardly extending flange on said tubular member for limiting the movement of the latter from its retracted inoperative position to its operative position in which it projects beyond the front end of the lens mount.

7. In combination with a photographic objective provided with a lens mount comprising two concentrically arranged sleeve members connected at one end with each other and forming an annular space between each other at the other end, an adjustable diaphragm, a rotatable diaphragm adjusting ring mounted within the annular space between said sleeve members and projecting therefrom, a tubular member forming a sunshade attached axially adjustable on the outer circumference of an annular projection on the outer sleeve member, a ring mounted for axial movement on said outer sleeve member, and means operatively connecting said diaphragm adjusting ring with said ring for adjusting the latter when said diaphragm adjusting ring is rotated, said means comprising a pin on said ring extending through a guide slot in said outer sleeve member and into a cam slot arranged in said diaphragm adjusting ring, said ring being loosely surrounded by said tubular member and being adapted to be engaged by an inwardly extending flange on said tubular member for limiting the movement of the latter from its retracted inoperative position to its operative position in which it projects beyond the front end of the lens mount.

8. In combination with a photographic objective provided with a lens mount comprising two concentrically arranged sleeve members connected at one end with each other and forming an annular space between each other at the other end, an adjustable diaphragm, a rotatable diaphragm adjusting ring mounted within the annular space between said sleeve members and projecting therefrom, a tubular member forming a sunshade attached axially adjustable on the outer circumference of the outer sleeve member, a ring mounted for axial movement on said outer sleeve member, means operatively connecting said diaphragm adjusting ring with said ring for adjusting the latter when said diaphragm adjusting ring is rotated, said ring being adapted to be engaged by said tubular member for limiting the movement of the latter from its retracted inoperative position to its operative position in which it projects beyond the front end of the lens mount, the front face of said lens mount being provided with a scale, and the edge of the diaphragm adjusting ring projecting outwardly from said lens mount having an index thereon cooperating with said scale.

HUBERT NERWIN.